Dec. 3, 1935.  F. KOCKS  2,023,231
ROLLING MILL DRIVING MEANS
Filed Aug. 5, 1933
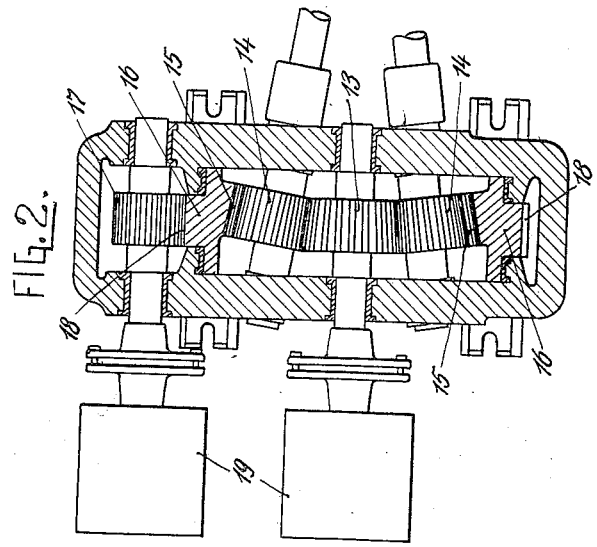
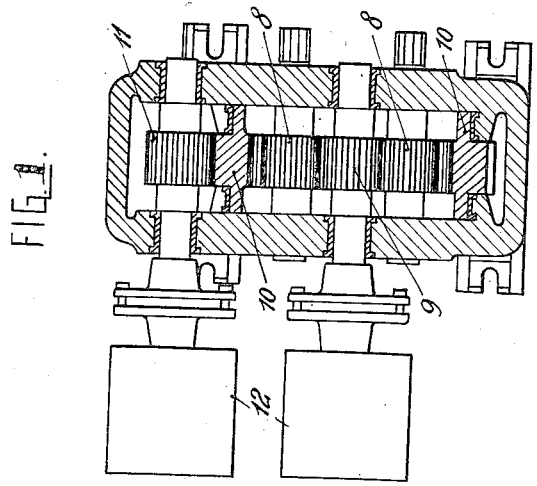
Inventor:
Fritz Kocks
by [signature]
Atty.

Patented Dec. 3, 1935

2,023,231

UNITED STATES PATENT OFFICE 2,023,231

ROLLING MILL DRIVING MEANS

Fritz Kocks, Dusseldorf, Germany

Application August 5, 1933, Serial No. 683,870
In Germany February 2, 1933

3 Claims. (Cl. 80—54)

My invention relates to rolling mills and more particularly to means for driving the rolls.

It is an object of my invention to provide means whereby large forces can be transmitted onto the pinions serving to drive the operating rolls, while at the same time reducing as far as possible the pressures arising in the bearings in which the pinions are supported.

To this end, according to the present invention, two driving wheels are provided for each pinion, and I prefer arranging these driving wheels diametrically opposite each other in order to thereby relieve the pinions of the pressure acting thereon in their bearings, the teeth pressures of the two driving wheels rotating in opposite direction compensating each other. The wear of the bearings is thus reduced to a minimum and the pinions may therefore be allowed to rotate at materially higher numbers of revolutions.

In order to provide for an equal transmission of power from the two driving wheels onto the pinions driven by them I prefer coupling each driving wheel with a separate motor, which may be an electromotor, a steam engine or the like.

My invention offers quite particular and unforeseen advantages when applied to rolling mills provided with cross rolls, i. e. rolls extending in different planes at an angle to each other, and in this case all pinions may be made to mesh with the two driving wheels, one of which is an inner wheel formed with a toothed rim, while the other one is an outer wheel with inner gearing which surrounds all the pinions and the inner driving wheel.

In a drive of this kind it is of no avail whether the pinions are mounted on the roll journals or supported at both ends in a separate housing.

Particular advantages are obtained if the pinions are formed with conical or hyperboloidal gearing.

In the drawing affixed to this specification and forming part thereof two modifications of roll-forming mill drives embodying my invention are illustrated diagrammatically by way of example.

In the drawing

Fig. 1 is a plan view, partly in section, of a pinion drive comprising an inner and an outer driving wheel, and Fig. 2 illustrates a modified form of this drive.

Referring to the drawing and first to Fig. 1, 8, 8 are two out of a greater number of pinions, say three or four, according to the number of rolls to be driven, and 9 is the inner driving wheel meshing with all the pinions surrounding it. 10 is an internally and externally toothed rim surrounding and meshing with all the pinions 8 to drive them, and 11 is an outer wheel meshing with said rim. 12, 12 are the motors driving the wheels 9 and 11. The inner driving wheel 9 drives the three pinions from within, while the toothed rim 10, encircling the pinions, forms the outer driving wheel. The two motors transmit power onto the pinions.

Fig. 2 illustrates a similar arrangement, however here power is transmitted onto inclined rolls 10 and the inner driving wheel 13, the pinions 14, 14 and the internal gears 15 of the rim 16 have the character of bevel gears, while the wheel 17 and the external gear 18 of the rim 16 meshing therewith are formed as cylinders. 19, 19 are the two motors. In this arrangement the mathematical axes of the pinions meet in the centre point of the roll system and are substantially or fully aligned with the roll axes, whereby the want of symmetry arising during each revolution, whenever these axes are not in alignment, is practically eliminated.

I wish it to be understood that I do not desire to be limited to the exact details of construction shown and described for obvious modifications will occur to a person skilled in the art.

I claim:

1. A rolling mill comprising a plurality of co-acting rolls, a separate pinion operatively connected with each roll, an inner driving wheel meshing with all said pinions, an internally and externally toothed rim surrounding and meshing with all said pinions and an outer driving wheel arranged to act on said rim, said pinions, said inner driving wheel and the internal gear of said rim being formed as non-cylindrical bodies.

2. A rolling mill comprising a plurality of co-acting rolls, a separate pinion operatively connected with each roll, an inner driving wheel meshing with all said pinions, an internally and externally toothed rim surrounding and meshing with all said pinions and an outer driving wheel arranged to act on said rim, said pinions, said inner driving wheel and the internal gear of said rim being formed as cones.

3. A rolling mill comprising a plurality of rolls, a separate gear wheel operatively connected with each roll, the axes of said gear wheels being equidistant from a centre point, a centrally located driving wheel meshing with all said gear wheels, an internally and externally toothed rim encircling and meshing with all said gear wheels and an eccentrically located driving wheel meshing with said rim.

FRITZ KOCKS.